US011517010B1

(12) United States Patent
Jacob

(10) Patent No.: US 11,517,010 B1
(45) Date of Patent: Dec. 6, 2022

(54) VEHICLE DEPLOYABLE ENCLOSURE ASSEMBLY

(71) Applicant: Nick Jacob, St. Francisville, LA (US)

(72) Inventor: Nick Jacob, St. Francisville, LA (US)

(*) Notice: Subject to any disclaimer, the term of this patent is extended or adjusted under 35 U.S.C. 154(b) by 629 days.

(21) Appl. No.: 16/555,791

(22) Filed: Aug. 29, 2019

(51) Int. Cl.
*A01M 31/02* (2006.01)
*E04B 1/343* (2006.01)
*E04H 15/00* (2006.01)
*E04H 1/12* (2006.01)
*B60D 1/52* (2006.01)
*B60P 1/50* (2006.01)

(52) U.S. Cl.
CPC .......... *A01M 31/025* (2013.01); *A01M 31/02* (2013.01); *B60D 1/52* (2013.01); *E04B 1/34336* (2013.01); *E04B 1/34352* (2013.01); *E04H 1/1205* (2013.01); *E04H 15/001* (2013.01); *B60P 1/50* (2013.01)

(58) Field of Classification Search
CPC . A01M 31/025; A01M 31/02; E04B 1/34336; E04B 1/34352; E04H 1/1205; E04H 15/001; E04H 2001/1283; B60P 1/50; B60D 1/52
USPC ......... 135/88.13, 120.1, 901; 52/79.5, 122.1, 52/143, 745.2
See application file for complete search history.

(56) References Cited

U.S. PATENT DOCUMENTS

| 2,854,705 | A | * | 10/1958 | Mcclaran | A01M 31/00 182/115 |
| 3,480,174 | A | * | 11/1969 | Sherwood | B65D 88/022 294/67.4 |
| 3,688,933 | A | * | 9/1972 | Rumell | B66F 9/186 414/608 |
| 4,242,035 | A | * | 12/1980 | Hornstein | B66F 9/12 37/405 |
| 4,390,314 | A | * | 6/1983 | Oberg | B60P 1/50 414/547 |
| 4,614,252 | A | | 9/1986 | Tarner | |
| 4,635,412 | A | * | 1/1987 | Le Poittevin | E04B 1/3442 52/79.5 |
| 5,052,734 | A | * | 10/1991 | Hasegawa | B66C 1/663 294/81.53 |
| 5,102,179 | A | * | 4/1992 | Royer | B60P 3/34 182/69.6 |
| 5,244,339 | A | * | 9/1993 | Normand | B07C 3/02 414/812 |

(Continued)

FOREIGN PATENT DOCUMENTS

EP 3155900 A1 * 4/2017 ............ A01M 31/02

*Primary Examiner* — Robert Canfield
(74) *Attorney, Agent, or Firm* — R. Keith Harrison

(57) ABSTRACT

A vehicle-deployable enclosure assembly for deployment on a supporting surface using a lifting vehicle may include an enclosure base which is deployable between a collapsed configuration and an extended, enclosure-supporting configuration. An enclosure may be carried by the enclosure base. At least one attachment system may be provided on the enclosure. The at least one attachment system may be configured to facilitate attachment of the enclosure to the lifting vehicle. The enclosure base may be configured to deploy from the collapsed configuration to the extended, enclosure-supporting configuration in which the enclosure base supports the enclosure over the supporting surface responsive to lifting of the enclosure by operation of the lifting vehicle.

19 Claims, 15 Drawing Sheets

(56) References Cited

U.S. PATENT DOCUMENTS

| | | | | |
|---|---|---|---|---|
| 5,285,604 A | * | 2/1994 | Carlin | E04H 1/1205 52/36.2 |
| 5,317,857 A | * | 6/1994 | Allison | E04H 1/1205 52/DIG. 5 |
| 5,409,081 A | | 4/1995 | Reeves | |
| 5,761,854 A | * | 6/1998 | Johnson | B60P 3/34 52/79.5 |
| 5,862,827 A | * | 1/1999 | Howze | E04H 15/001 135/900 |
| 5,881,839 A | | 3/1999 | Stanley | |
| 6,179,522 B1 | * | 1/2001 | Sanford | E04H 5/02 588/259 |
| 6,287,070 B1 | * | 9/2001 | Perry | B66F 9/12 414/724 |
| 6,347,684 B1 | | 2/2002 | Fath et al. | |
| 6,739,428 B1 | * | 5/2004 | Holmes | A01M 31/02 182/127 |
| 6,848,883 B2 | * | 2/2005 | Atencio | A01D 87/0076 414/24.5 |
| 6,978,862 B1 | * | 12/2005 | Cotten, Sr. | A01M 31/025 182/127 |
| 7,513,333 B2 | | 4/2009 | Davis | |
| 7,946,607 B1 | | 5/2011 | Neal, Jr. et al. | |
| 8,777,254 B1 | * | 7/2014 | Fowler | A01M 31/02 280/656 |
| 11,193,287 B2 | * | 12/2021 | Tan | B66F 9/18 |
| 2003/0000769 A1 | * | 1/2003 | Pyle | E06C 1/39 182/127 |
| 2005/0091941 A1 | * | 5/2005 | Baird | B66F 11/04 52/633 |
| 2006/0162999 A1 | * | 7/2006 | Atkins | E06C 5/04 182/63.1 |
| 2007/0029136 A1 | * | 2/2007 | Kirby | A01M 31/02 182/63.1 |
| 2007/0144043 A1 | * | 6/2007 | Semke | E02F 3/962 37/403 |
| 2007/0201972 A1 | * | 8/2007 | Tsuji | B60K 17/16 414/718 |
| 2007/0209294 A1 | * | 9/2007 | Harvey | E04B 1/3445 52/79.1 |
| 2009/0236179 A1 | * | 9/2009 | Lopez | A01M 31/02 182/63.1 |
| 2012/0037198 A1 | * | 2/2012 | Cantin | E04B 1/3442 220/1.5 |
| 2012/0037621 A1 | * | 2/2012 | Cantin | B65D 19/44 220/4.28 |
| 2012/0037622 A1 | * | 2/2012 | Cantin | E04B 1/34357 220/23.83 |
| 2015/0027067 A1 | * | 1/2015 | Finney | E04B 1/34336 52/79.5 |
| 2015/0300321 A1 | * | 10/2015 | Haar | F03D 9/255 206/223 |
| 2015/0315776 A1 | * | 11/2015 | Duncan | E04B 1/3442 52/66 |
| 2017/0156309 A1 | | 6/2017 | Muegerl | |
| 2017/0341860 A1 | * | 11/2017 | Dodds | B60P 1/50 |
| 2018/0313075 A1 | * | 11/2018 | Lucho Do Valle | E04B 1/34352 |
| 2019/0217929 A1 | * | 7/2019 | Lefevre | B63B 35/44 |
| 2022/0041420 A1 | * | 2/2022 | Decker | B66F 11/04 |

\* cited by examiner

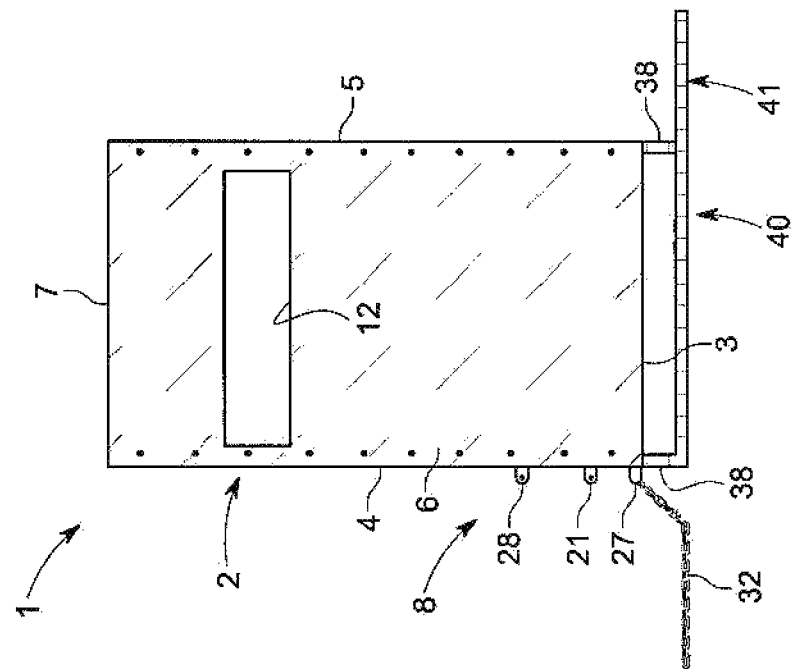
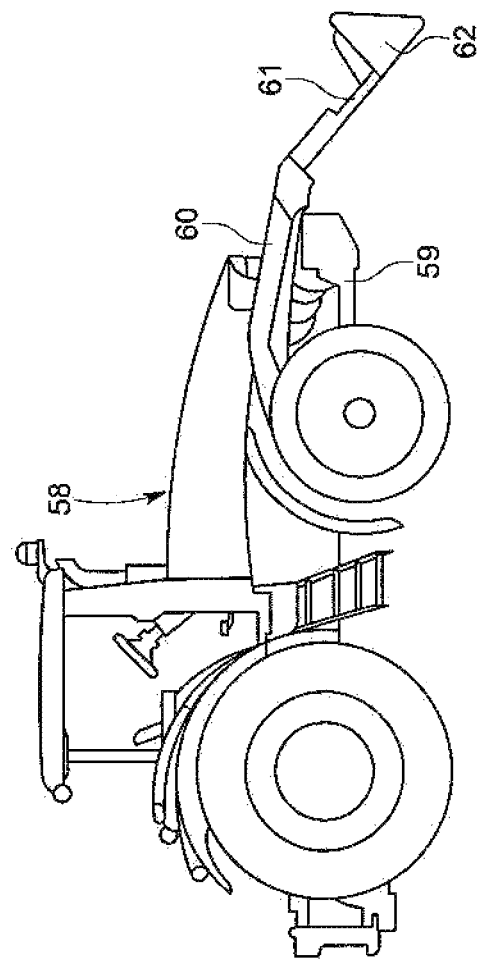
FIG. 8

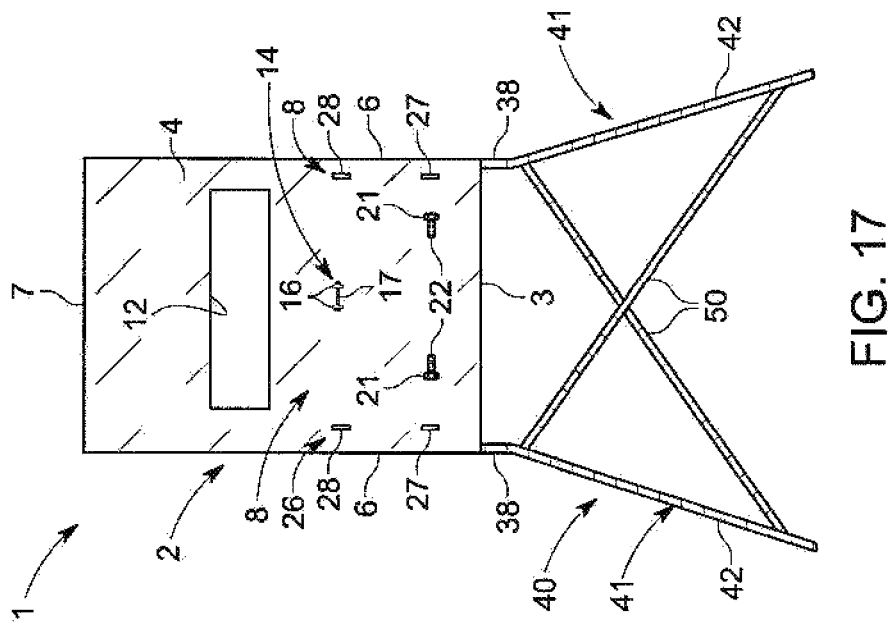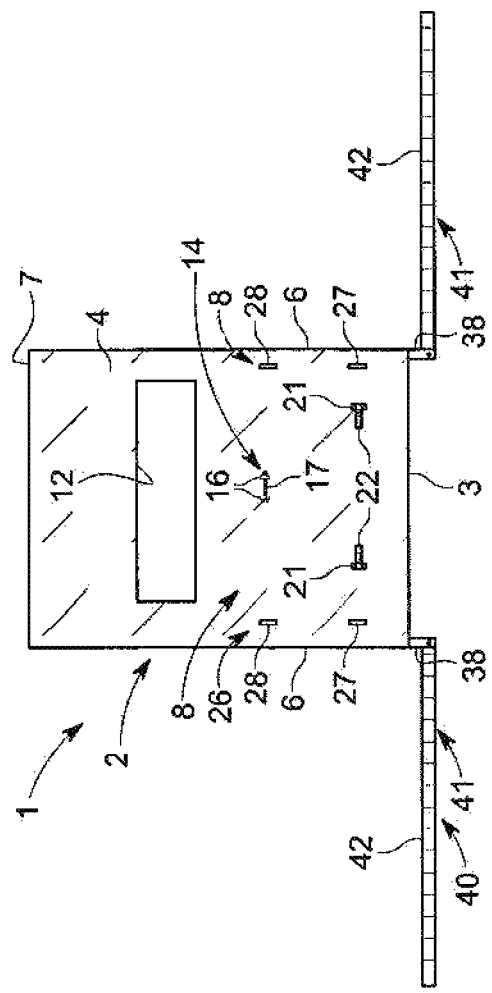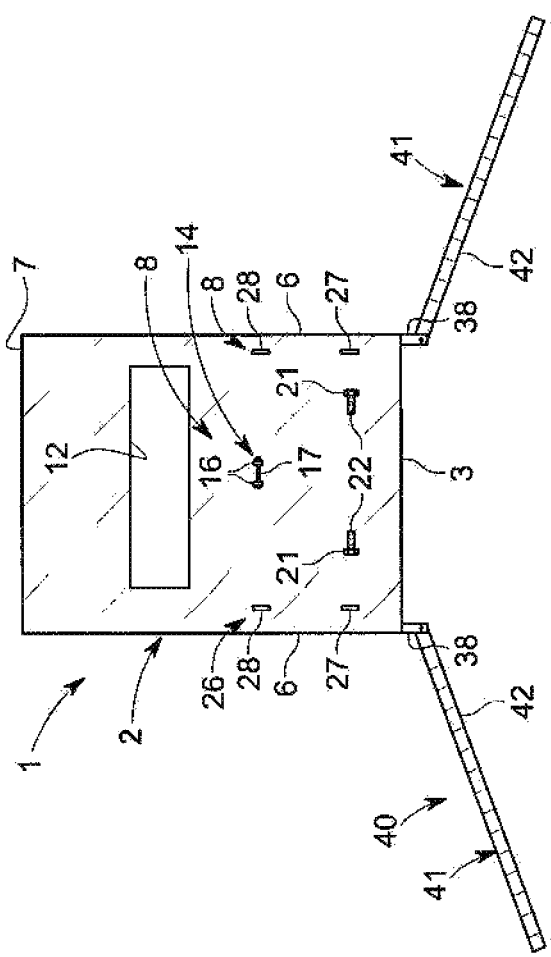

VEHICLE DEPLOYABLE ENCLOSURE ASSEMBLY

FIELD

Illustrative embodiments of the disclosure relate to elevated enclosures such as hunting stands and the like. More particularly, the illustrative embodiments of the disclosure relate to a vehicle-deployable enclosure assembly which can be deployed on a supporting surface using a lifting vehicle.

SUMMARY

Illustrative embodiments of the disclosure are generally directed to a vehicle-deployable enclosure assembly for deployment on a supporting surface using a lifting vehicle. An illustrative embodiment of the vehicle-deployable disclosure assembly may include an enclosure base which is deployable between a collapsed configuration and an extended, enclosure-supporting configuration. An enclosure may be carried by the enclosure base. At least one attachment system may be provided on the enclosure. The at least one attachment system may be configured to facilitate attachment of the enclosure to the lifting vehicle. The enclosure base may be configured to deploy from the collapsed configuration to the extended, enclosure-supporting configuration in which the enclosure base supports the enclosure over the supporting surface responsive to lifting of the enclosure by operation of the lifting vehicle.

BRIEF DESCRIPTION OF THE DRAWINGS

Illustrative embodiments of the disclosure will now be described, by way of example, with reference to the accompanying drawings, wherein:

FIGS. 8-12 are respective left side views of the assembly, more particularly illustrating typical sequential attachment of a bucket on a lifting vehicle to the enclosure and deployment of the enclosure base in the extended, enclosure-supporting configuration responsive to lifting of the enclosure by operation of the lifting vehicle;

FIG. 15 is a front view of the assembly with the enclosure base deployed in the collapsed configuration;

FIG. 16 is a front view of the assembly with the enclosure base deployed in a partially extended configuration as the enclosure is lifted by operation of the lifting vehicle (not illustrated);

FIG. 17 is a front view of the assembly with the enclosure base deployed in the extended, enclosure-supporting configuration and the enclosure in the elevated position on the enclosure base;

DETAILED DESCRIPTION

Figure 1:
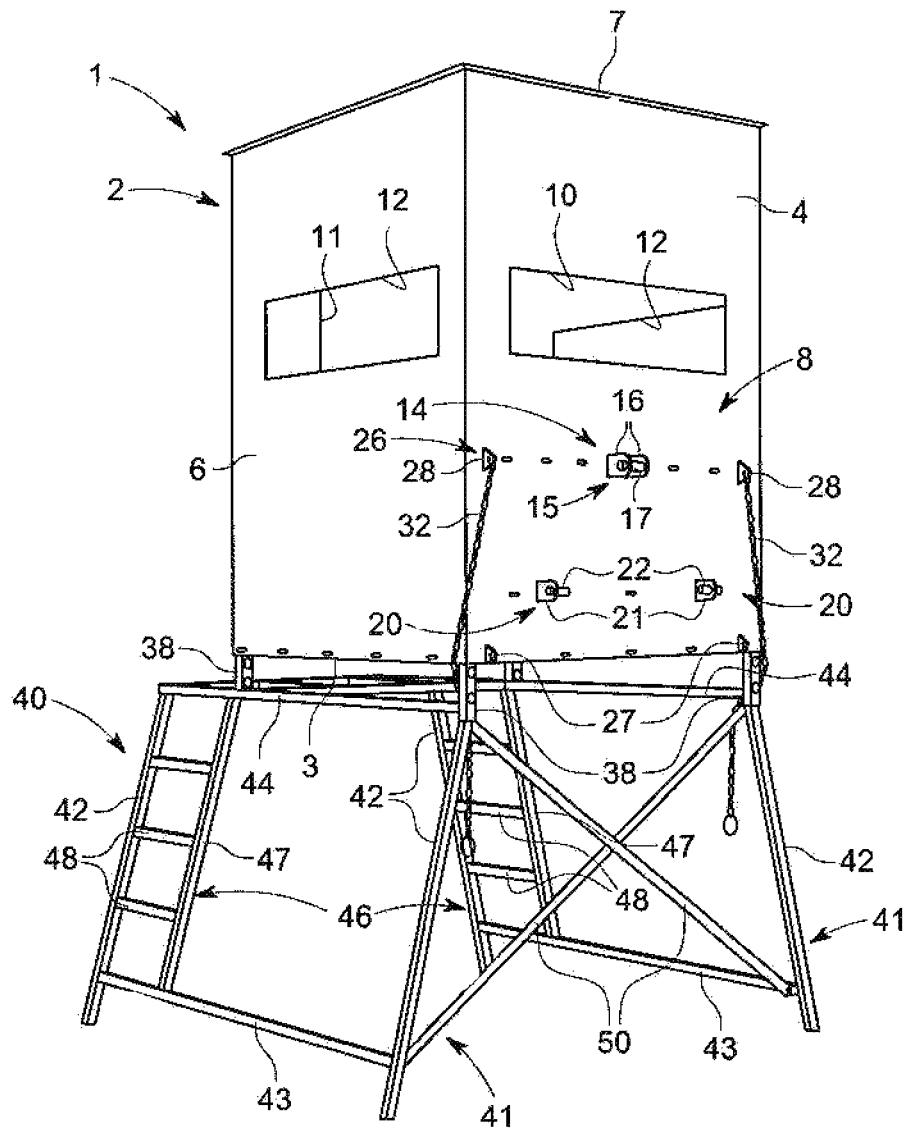
FIG. 1 is a front perspective view of an illustrative embodiment of the vehicle deployable enclosure assembly, with the enclosure base deployed in an extended, enclosure-supporting configuration in typical application of the assembly.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical". "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring initially to FIGS. 8-12 of the drawings, an illustrative embodiment of the vehicle-deployable enclosure assembly, hereinafter assembly, is generally indicated by reference numeral 1. The assembly 1 may include an extendable and collapsible enclosure base 40. An enclosure 2 may be supported by the enclosure base 40. At least one attachment system 8 may be provided on the enclosure 2. The attachment system 8 may facilitate attachment of the enclosure 2 to a lifting vehicle 58 typically in a manner which will be hereinafter described. The enclosure base 40 may be configured to deploy from the collapsed configuration illustrated in FIGS. 8-10 to the extended, enclosure-supporting configuration illustrated in FIG. 12 to support the enclosure 2 in an elevated position with respect to the ground or other supporting surface (not illustrated) responsive to lifting of the enclosure 2 by operation of the lifting vehicle 58, typically as will be hereinafter described.

Figure 3:
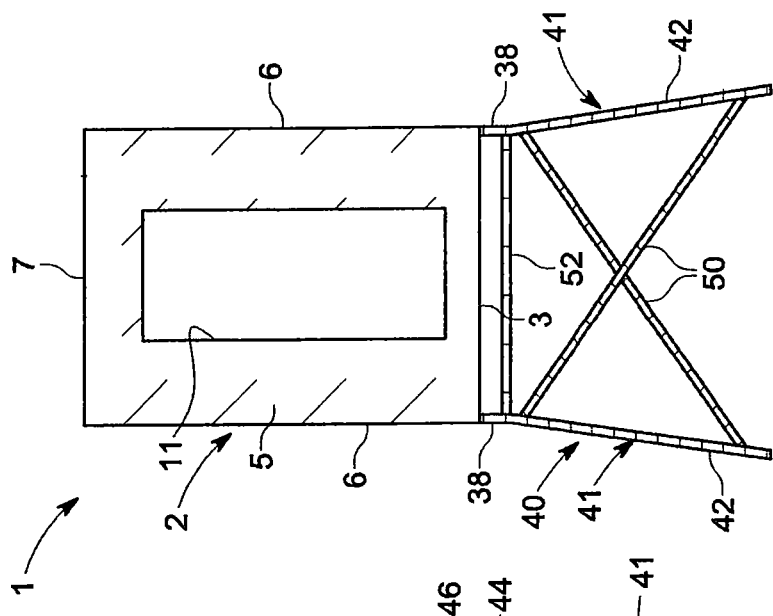
FIG. 3 is a front view of the assembly, with the enclosure base deployed in the extended, enclosure-supporting configuration.
Figure 4:
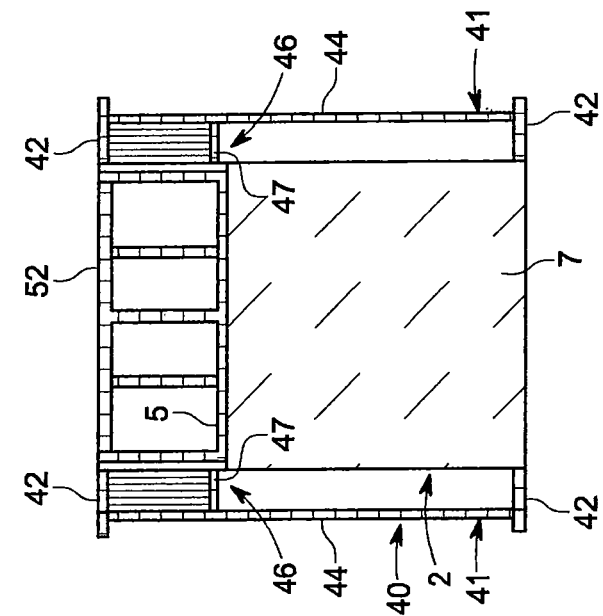
FIG. 4 is a top view of the assembly illustrated in FIG. 3.
Figure 5:
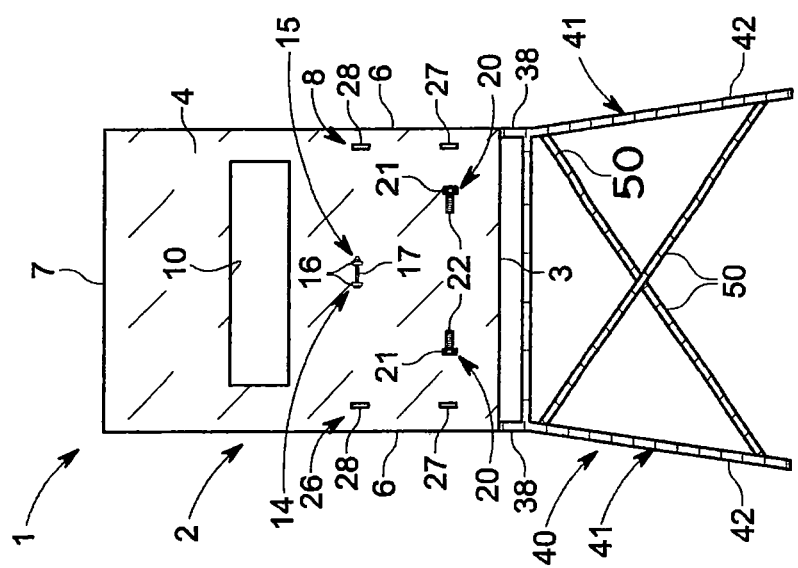
FIG. 5 is a rear view of the assembly illustrated in FIG. 3.

Referring next to FIGS. 1-7 of the drawings, in some embodiments, the enclosure 2 may include an enclosure floor 3. An enclosure front wall 4 and an enclosure rear wall 5 may extend from the enclosure floor 3 in spaced-apart relationship to each other. A pair of spaced-apart enclosure side walls 6 may extend from the enclosure floor 3 between the enclosure front wall 4 and the enclosure rear wall 5. An enclosure roof 7 may be provided on the enclosure front wall 4, the enclosure rear wall 5 and the enclosure side walls 6. In some applications, the enclosure 2 may serve as an observation or hunting stand. Accordingly, at least one front observation opening 10 may be provided in the enclosure front wall 4. At least one side observation opening 12 may be provided in at least one of the enclosures side walls 6. As illustrated in FIG. 5, a door opening 11 may be provided in the enclosure rear wall 5. The door opening 11 may facilitate ingress and egress to a user (not illustrated) of the assembly 1 with respect to the interior of the enclosure 2. It will be recognized and understood that the enclosure 2 may have alternative shapes and designs known by those skilled in the art depending on the intended application of the assembly 1.

Figure 2:
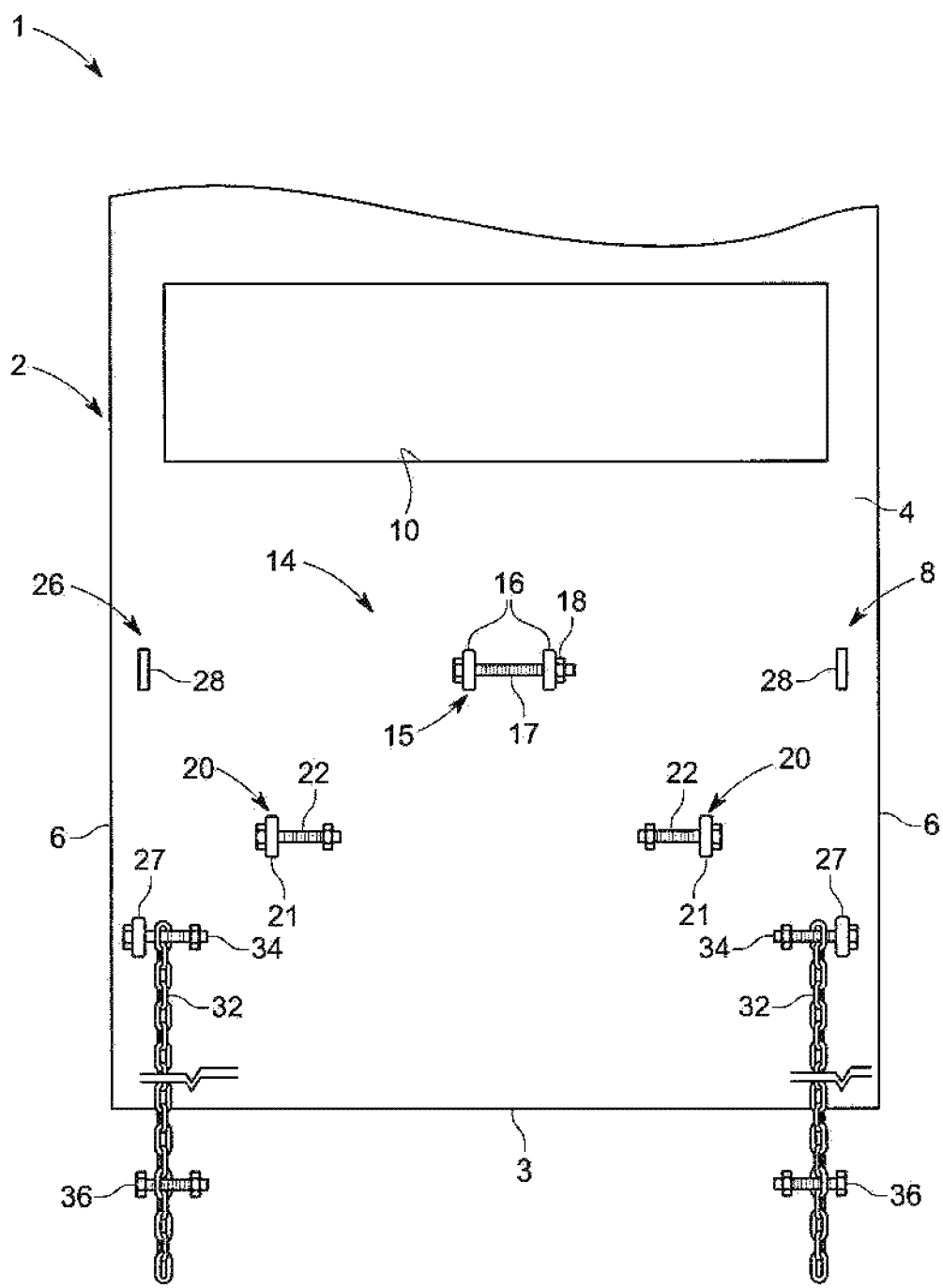
FIG. 2 is a front view, partially in section, of the enclosure of the assembly, more particularly illustrating a typical multi-point attachment system and a typical bucket attachment system provided on the enclosure to facilitate attachment of the enclosure to a bucket or a multi-point attachment bracket, respectively, on a lifting vehicle.

As illustrated in FIG. 2, in some embodiments, the attachment system 8 may include a multi-point attachment system 14 such as a three-point attachment system, for example and without limitation. Accordingly, the multi-point attachment system 14 may include an upper attachment element 15. A pair of spaced-apart lower attachment elements 20 may be provided generally beneath the upper attachment element 15. As used herein, "generally beneath" means that the lower attachment elements 20 are disposed in a plane which is beneath and parallel to a plane in which the upper attachment element 15 is disposed when the enclosure 2 is oriented in a vertical, functional position. The lower attachment elements 20 may be staggered with respect to the upper attachment element 15 such that an imaginary triangle is formed by a continuous line connecting the lower attachment elements 20 and the upper attachment element 15.

Figure 19:
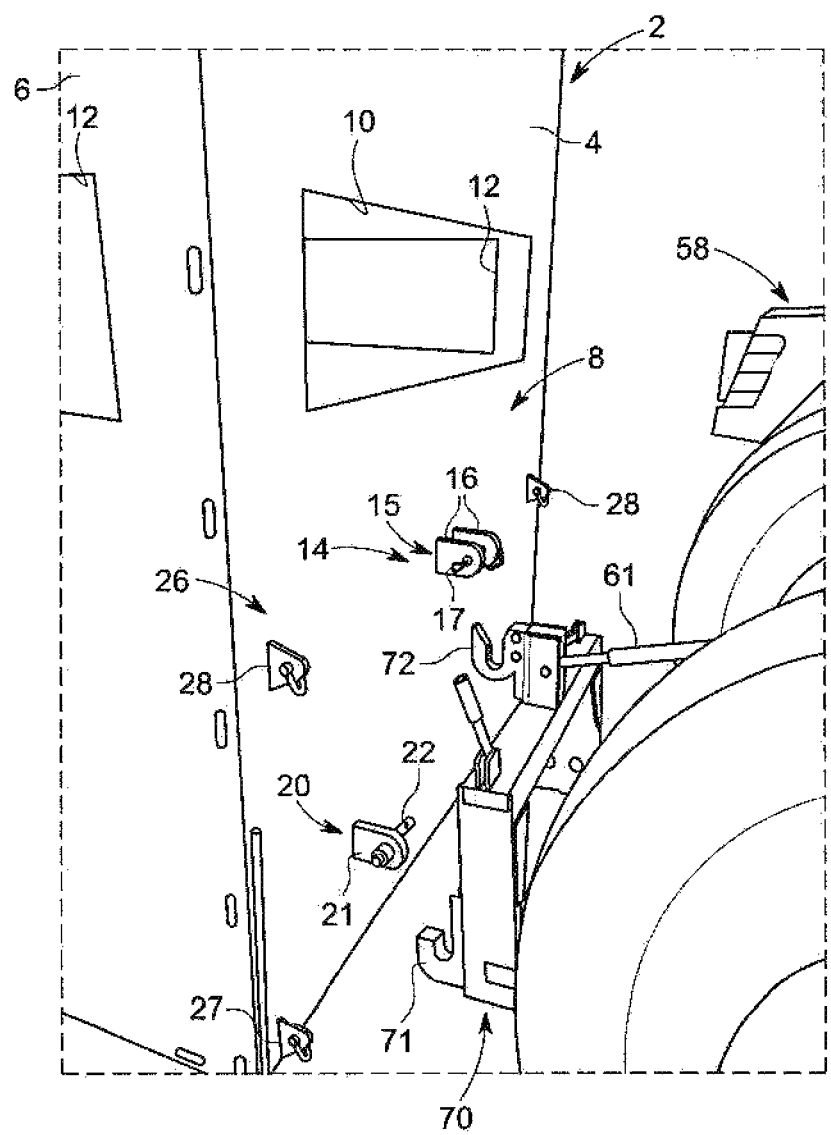
FIG. 19 is a sectioned front perspective view of the enclosure, preparatory to typical attachment of a multi-point hitch bracket on the lifting vehicle to the multi-point attachment system on the enclosure.
Figure 20:
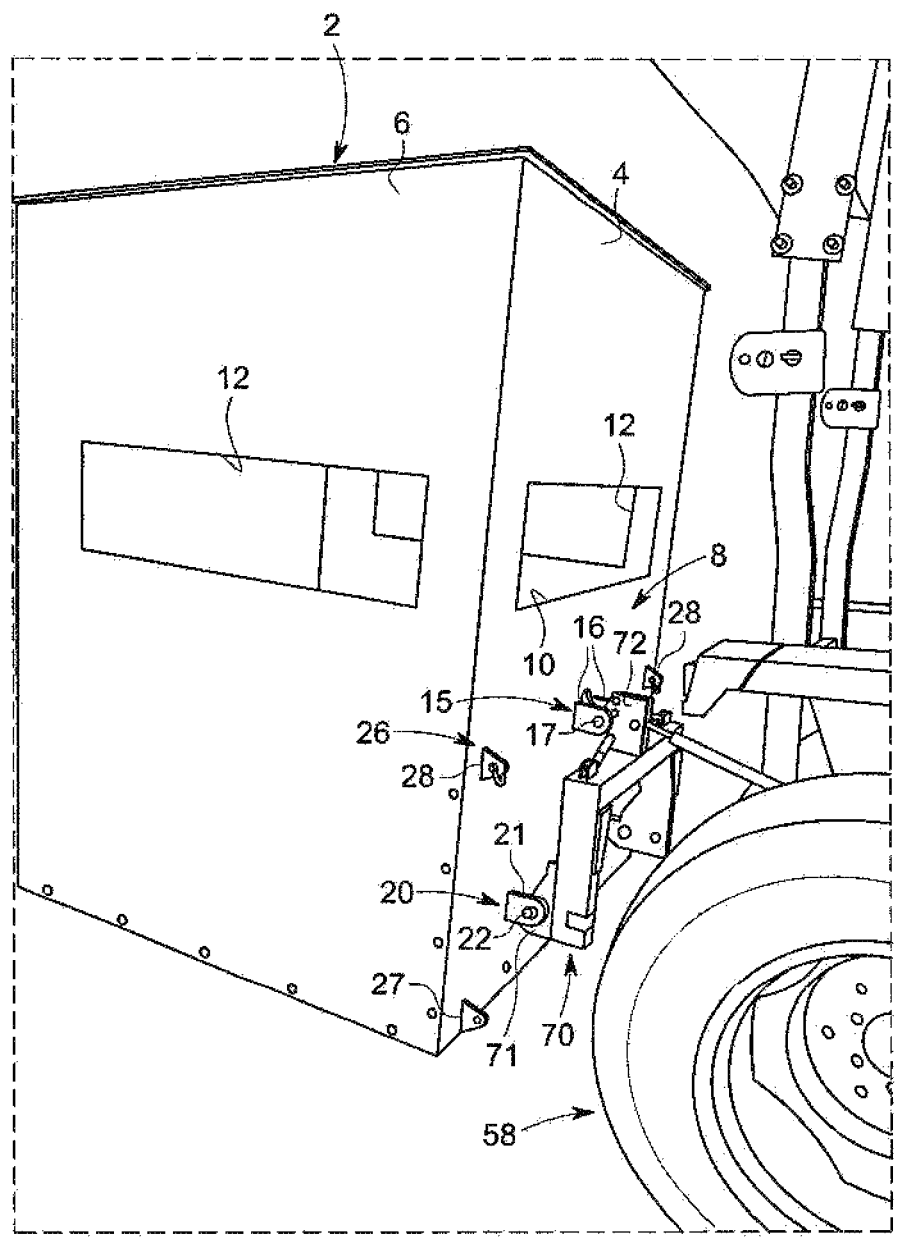
FIG. 20 is a front perspective view of the enclosure attached to the lifting vehicle by way of the multi-point hitch bracket.

In some embodiments, the upper attachment element 15 may include a pair of spaced-apart upper attachment element flanges 16 which may extend from the enclosure front wall 4 of the enclosure 2. An upper attachment element fastener 17 may engage the upper attachment element flanges 16. The upper attachment element fastener 17 may extend through registering threaded fastener openings (not illustrated) in the respective upper attachment element flanges 16. A nut 18 may be threaded on the upper attachment element fastener 17. Each lower attachment element 20 may include a lower attachment element flange 21. A lower attachment element fastener 22 may engage each lower attachment element flange 21. The lower attachment element fastener 22 may extend through a threaded fastener opening (not illustrated) in the lower attachment element flange 21. The upper attachment element 15 and the lower attachment elements 20 of the multi-point attachment system 14 may facilitate attachment of the enclosure 2 to the respective companion lower bracket hooks 71 and upper bracket hook 72 on a multi-point hitch bracket 70 provided on the lifting vehicle 58, as illustrated in FIGS. 19 and 20 and will be hereinafter described.

As further illustrated in FIG. 2, in some embodiments, the attachment system 8 may include a bucket attachment system 26. The bucket attachment system 26 may facilitate attachment of the enclosure 2 to a bucket 62 on the lifting vehicle 58, as illustrated in FIGS. 8-12 and will be hereinafter further described. The bucket attachment system 26 may include a first pair of a lower attachment flange 27 and an upper attachment flange 28 which may extend from the enclosure front wall 4 of the enclosure 2. The bucket attachment system 26 may further include a second pair of a lower attachment flange 27 and an upper attachment flange 28 which may extend from the front wall 4 of the enclosure 2 in spaced-apart relationship to the first pair of the lower attachment flange 27 and the upper attachment flange 28, respectively. A bucket fastening member 32 may be attached to a first one of each of the lower attachment flange 27 and the upper attachment flange 28 and attachable to the second one of the lower attachment flange 27 and the upper attachment flange 28. Accordingly, for example and without limitation, each bucket fastening member 32, attached typically to the corresponding lower attachment flange 27, may be extended around the bucket 62 on the lifting vehicle 58 and attached to the corresponding upper attachment flange 28 to facilitate attachment of the enclosure 2 to the bucket 62. In some embodiments, each bucket fastening member 32 may include a chain. A lower chain fastener 34 may attach a first end of the chain to the corresponding lower attachment flange 27. An upper chain fastener 36 may attach the chain to the corresponding upper attachment flange 28. Each of the lower chain fastener 34 and the upper chain fastener 36 may include a bolt, pin or other suitable releasable fastening member.

Figure 7:
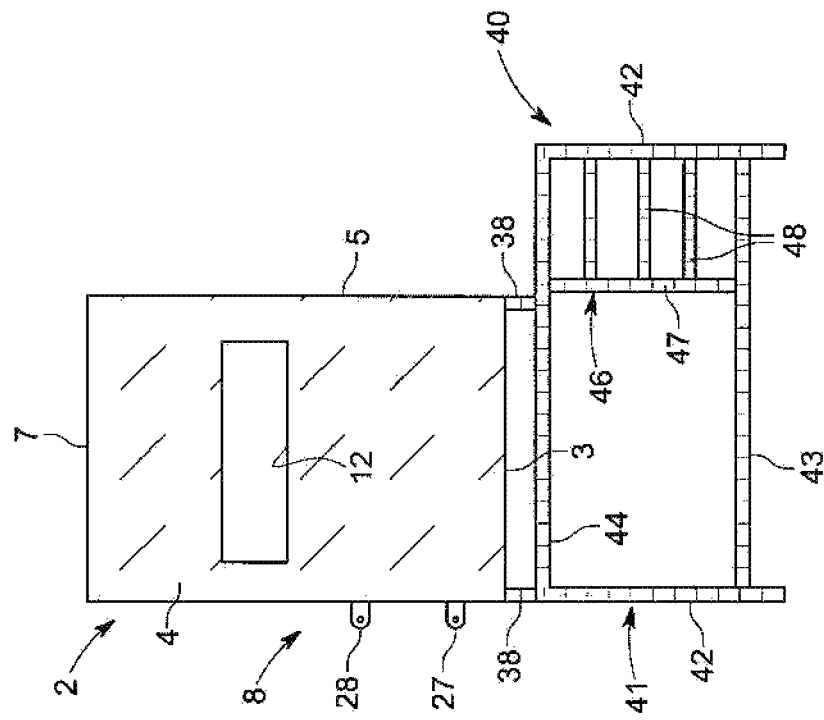
FIG. 7 is a left side view of the assembly illustrated in FIG. 3.
Figure 6:
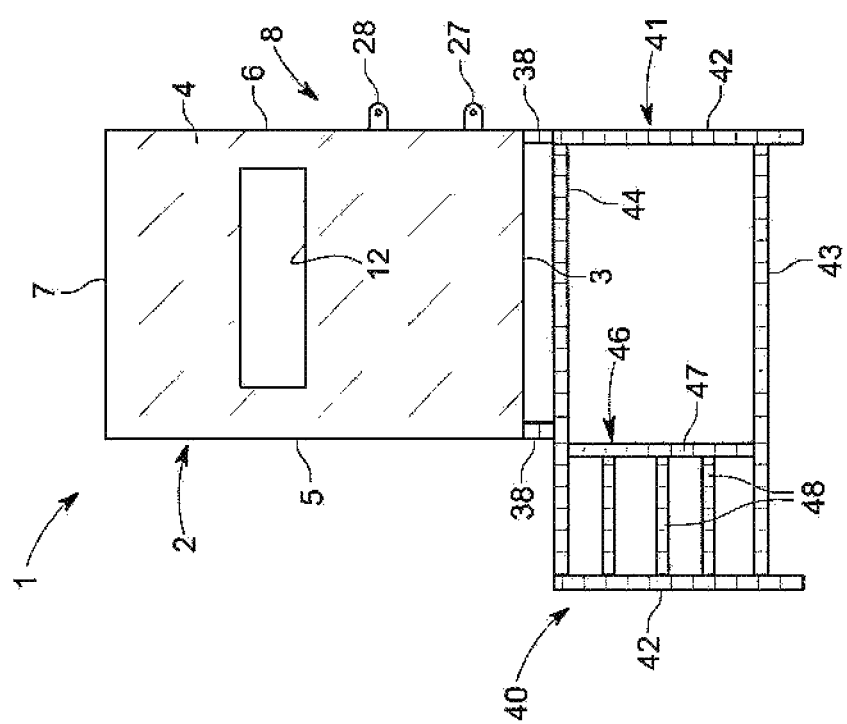
FIG. 6 is a right-side view of the assembly illustrated in FIG. 3.

As illustrated in FIGS. 1 and 3-7, the enclosure base 40 may include a pair of spaced-apart enclosure base legs 41. The enclosure base legs 41 may be pivotally attached to the enclosure 2 in spaced-apart relationship to each other according to the knowledge of those skilled in the art. As illustrated in FIGS. 6 and 7, in some embodiments, at least one of the enclosure base legs 41 may include at least one ladder 46. As illustrated in FIG. 4, an enclosure access platform 52 may be extended between the deployed enclosure base legs 41 in alignment with the ladder or ladders 46. The enclosure access platform 52 may be pinned, bolted and/or otherwise detachably attached to the enclosure base legs 41 according to the knowledge of those skilled in the art. As illustrated in FIGS. 4 and 5, the enclosure access platform 52 may extend beneath and to the rear of the enclosure rear wall 5 of the enclosure 2. Accordingly, a user (not illustrated) of the assembly 1 may access the interior of the enclosure 2 through the door opening 11 in the enclosure rear wall 5 by climbing the ladder 46 and standing on the enclosure access platform 52. As illustrated in FIGS. 3 and 5, in some embodiments, at least one pair of leg stabilizers 50 may be deployed between the deployed enclosure base legs 41 according to the knowledge of those skilled in the art for stabilization purposes.

As further illustrated in FIGS. 6 and 7, in some embodiments, each enclosure base leg 41 may be generally elongated and rectangular and may include a pair of elongated, parallel, spaced-apart side leg members 42. An elongated lower leg member 43 and an elongated upper leg member 44 may extend between the side leg members 42 in parallel, spaced-apart relationship to each other. In some embodiments, each ladder 46 may include a ladder member 47 which extends between the lower leg member 43 and the upper leg member 44 in spaced-apart relationship to the rearmost side leg member 42. Multiple ladder rungs 48 may extend between the side leg member 42 and the ladder member 47.

Each enclosure base leg 41 of the enclosure base 40 may be pivotally attached to the enclosure 2 according to the knowledge of those skilled in the art. Accordingly, in some embodiments, a pair of spaced-apart, front and rear leg mount members 38 may extend downwardly from the enclosure floor 3 on opposite sides of the enclosure 2. The enclosure base legs 41 may be pivotally attached to the respective pairs of leg mount members 38 using a pivot pin, hinge or other suitable mechanism (not illustrated). Accordingly, as illustrated in FIGS. 8-10 and 13, in the collapsed configuration of the enclosure base 40, the enclosure legs 41 are configured to lie in an outwardly extended position from the enclosure 2 in substantially coplanar relationship to each other on the ground or other support surface (not illustrated). As the lifting vehicle 58 is operated to lift the enclosure 2 from the ground or supporting surface, the enclosure base legs 41 may deploy from the collapsed configuration to the extended, enclosure-supporting configuration in which the deployed enclosure base 40 supports the enclosure 2 over the supporting surface. In transitioning from the collapsed configuration to the extended, enclosure-supporting configuration, the enclosure base legs 41 may swing-pivot by gravity on the enclosure 2 responsive to lifting of the enclosure 2 by operation of the lifting vehicle 58, as will be hereinafter further described.

Figure 10:
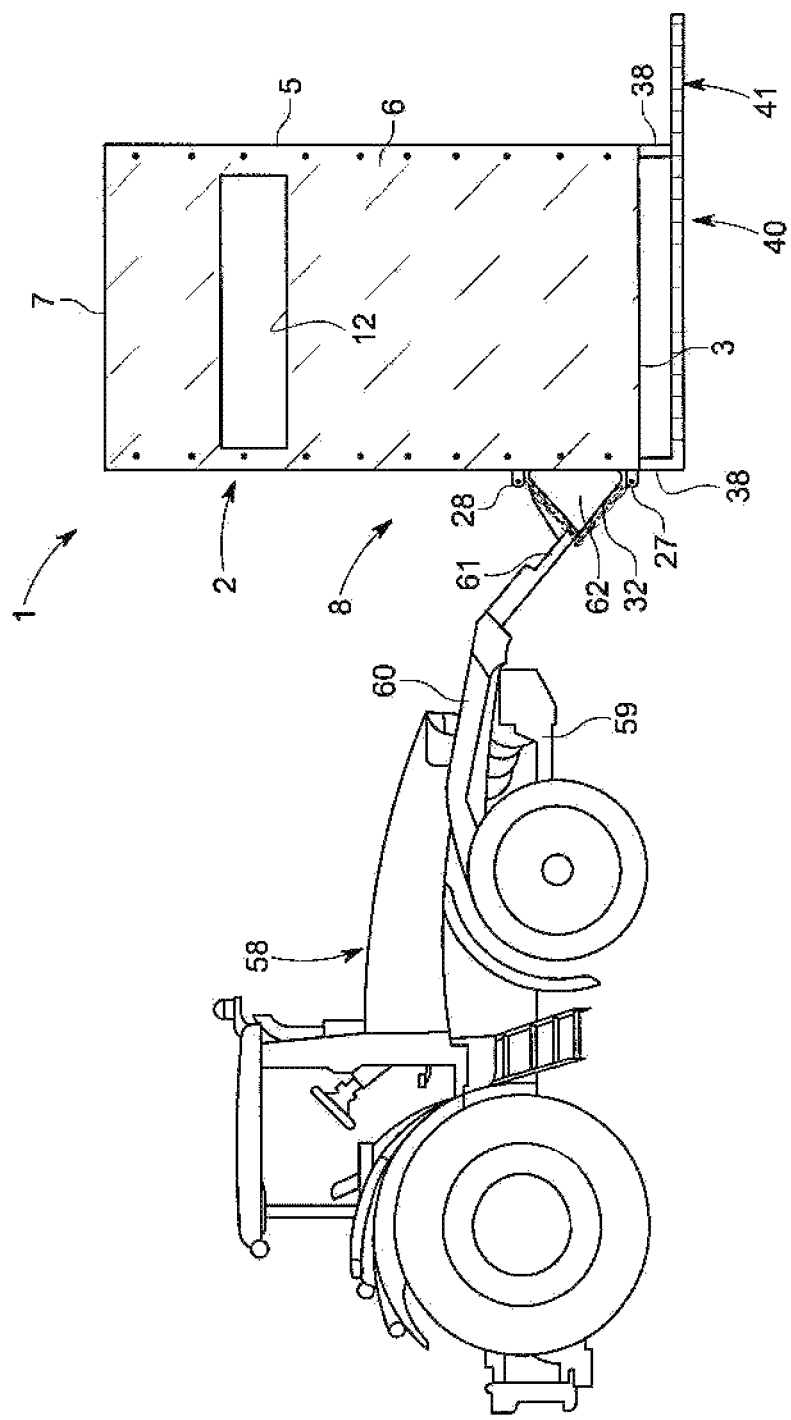
Figure 11:
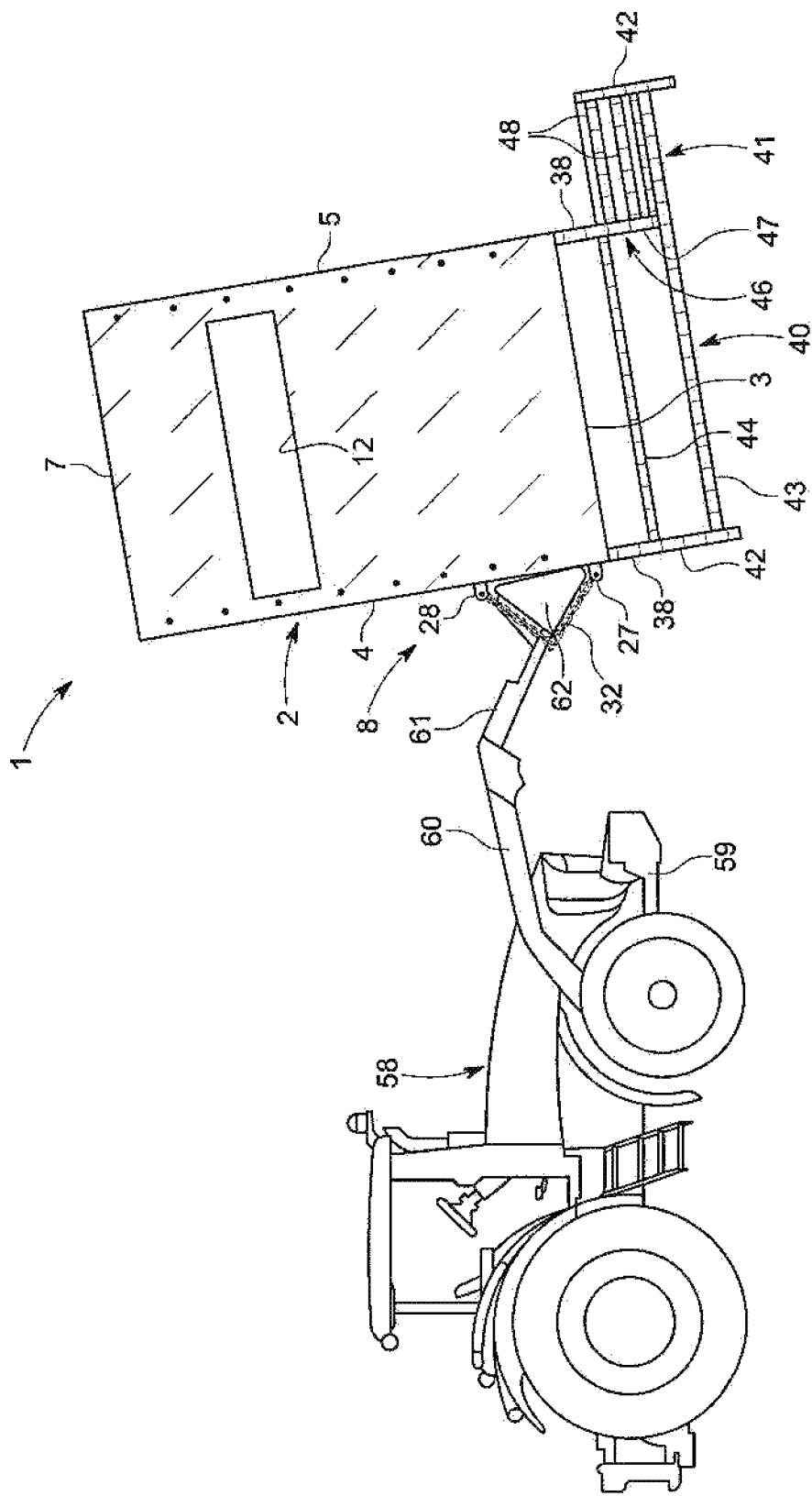
Figure 12:
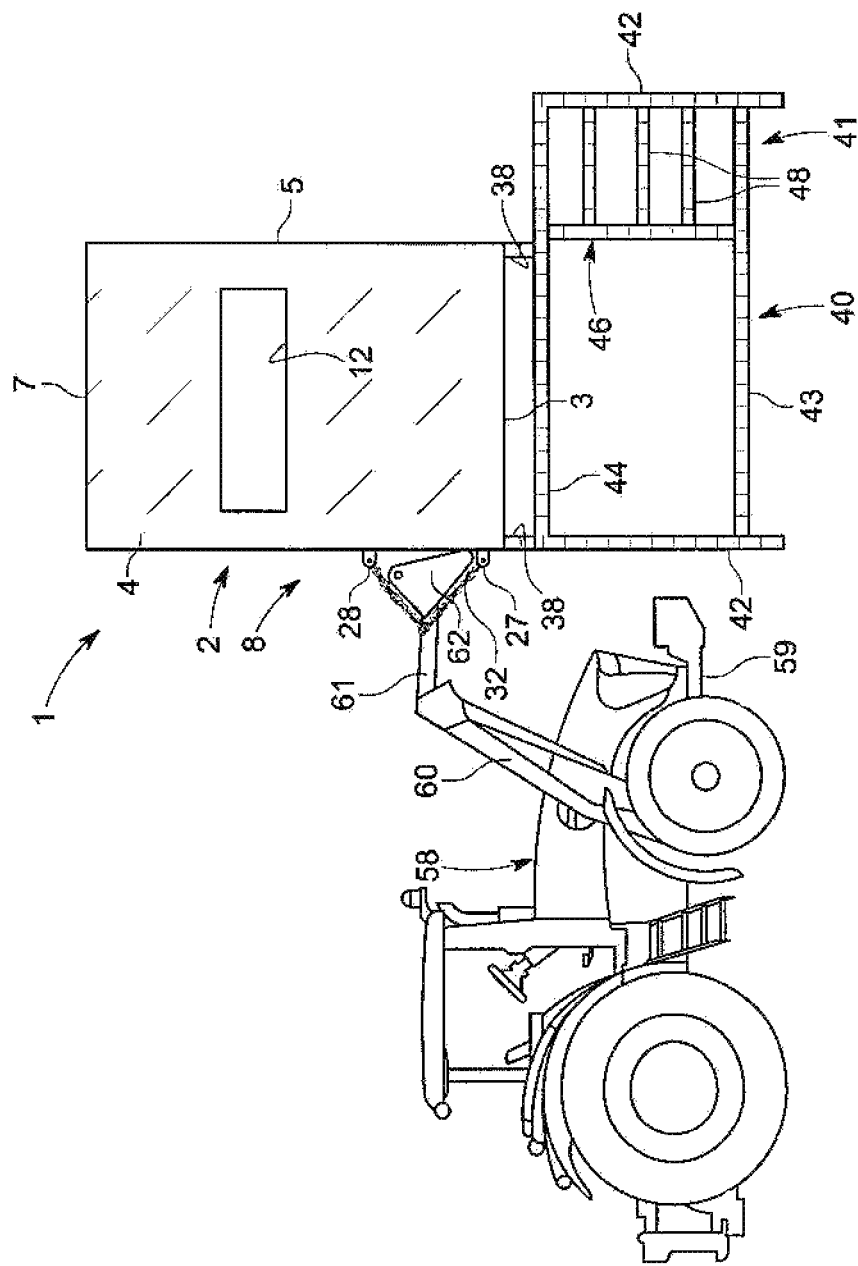
Figure 13:
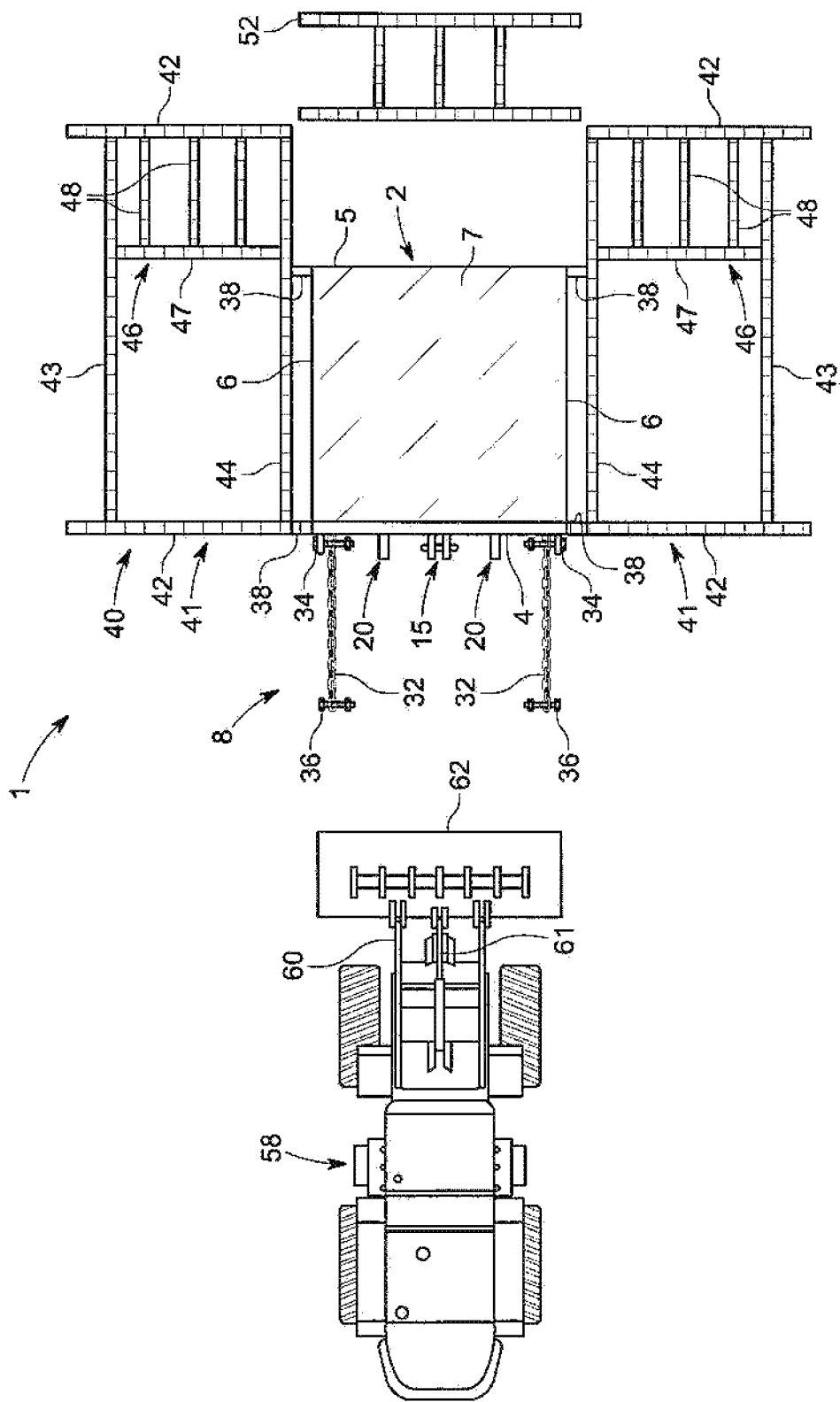
FIG. 13 is a top view of the assembly, with the enclosure base deployed in the collapsed, non-functional configuration preparatory to attachment of the enclosure to the lifting vehicle.
Figure 14:
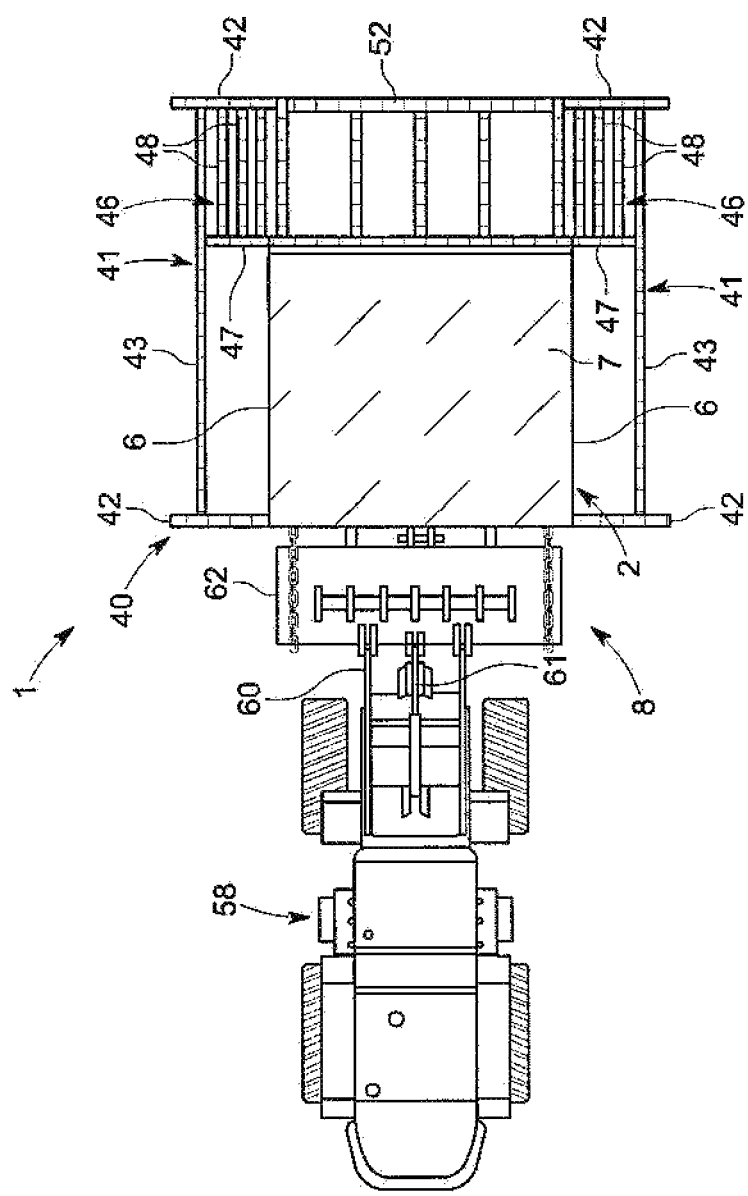
FIG. 14 is a top view of the assembly, with the enclosure attached to the bucket on the lifting vehicle and the enclosure base deployed in the extended, enclosure-supporting configuration.

Referring next to FIGS. 8-18 of the drawings, in typical application, the enclosure 2 of the assembly 1 may initially be secured to a lifting vehicle 58, which may subsequently be operated to lift the enclosure 2 from the ground or supporting surface (not illustrated) to facilitate simultaneous deployment of the enclosure base 40 from the collapsed configuration illustrated in FIGS. 8-10 and 13 to the extended, enclosure-supporting configuration illustrated in FIGS. 12 and 14. Accordingly, as illustrated in FIGS. 8 and 13, the enclosure 2 may initially be rested on the ground with the enclosure base legs 41 extending outwardly and horizontally in coplanar relationship to each other from respective sides of the enclosure 2. The bucket fastening members 32 may be extended from the respective lower attachment flanges 27 of the bucket attachment system 26 and placed on the ground. The lifting vehicle 58 may include any type of tractor, front-end loader, skid-steer loader or other like vehicle having a hydraulically-actuated lift which is capable of engaging the attachment system 8 on the enclosure 2 and raising or lifting the enclosure 2 above the ground. Accordingly, in some applications, the lifting vehicle 58 may include a chassis 59. A pair of spaced-apart loader arms 60 may extend forwardly from the chassis 59. A bucket 62 may be mounted on the extending end of the loader arms 60. At least one hydraulic cylinder 61 may engage the bucket 62 to facilitate pivoting deployment of the bucket 62 between loading and emptying configurations on the loader arms 60, typically in the conventional manner.

Figure 9:
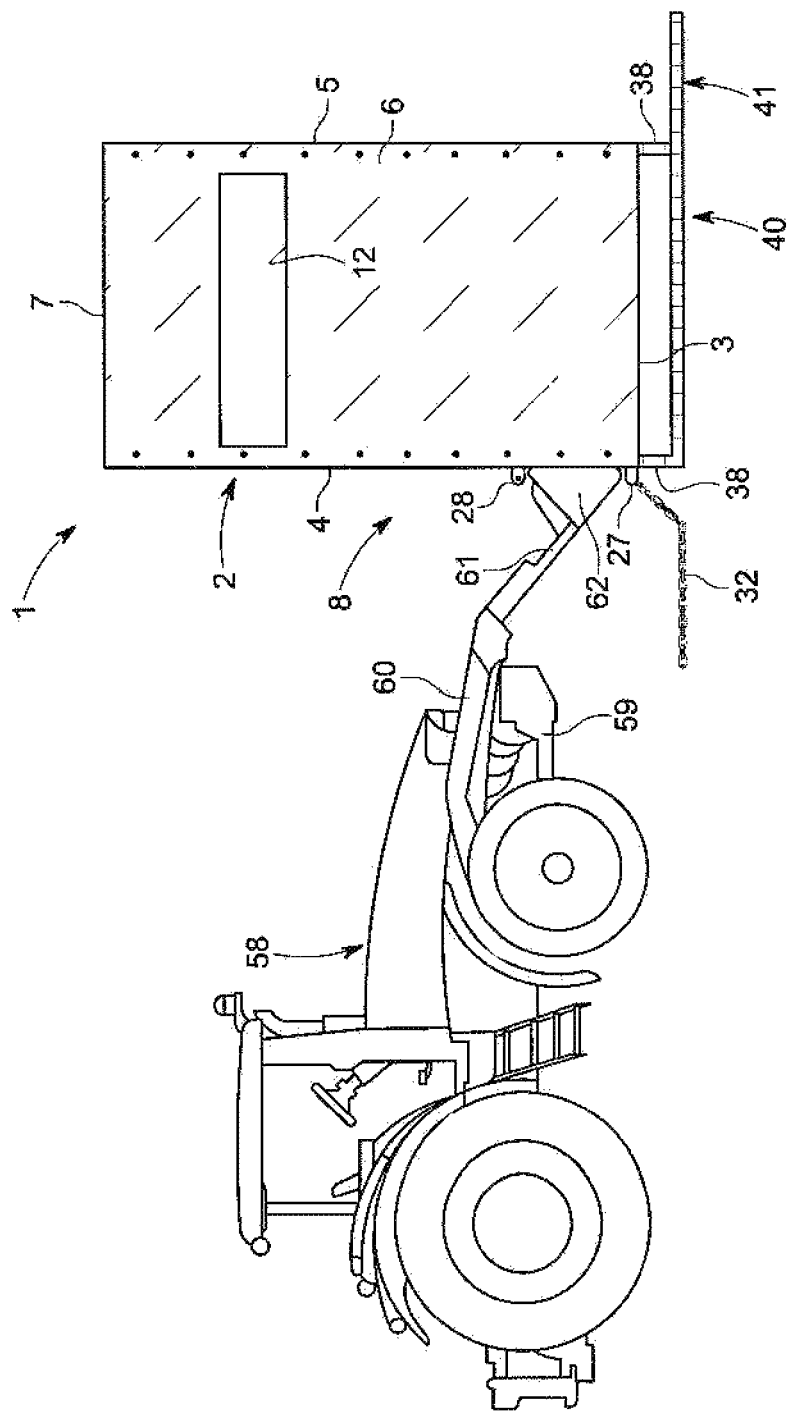
Figure 18:
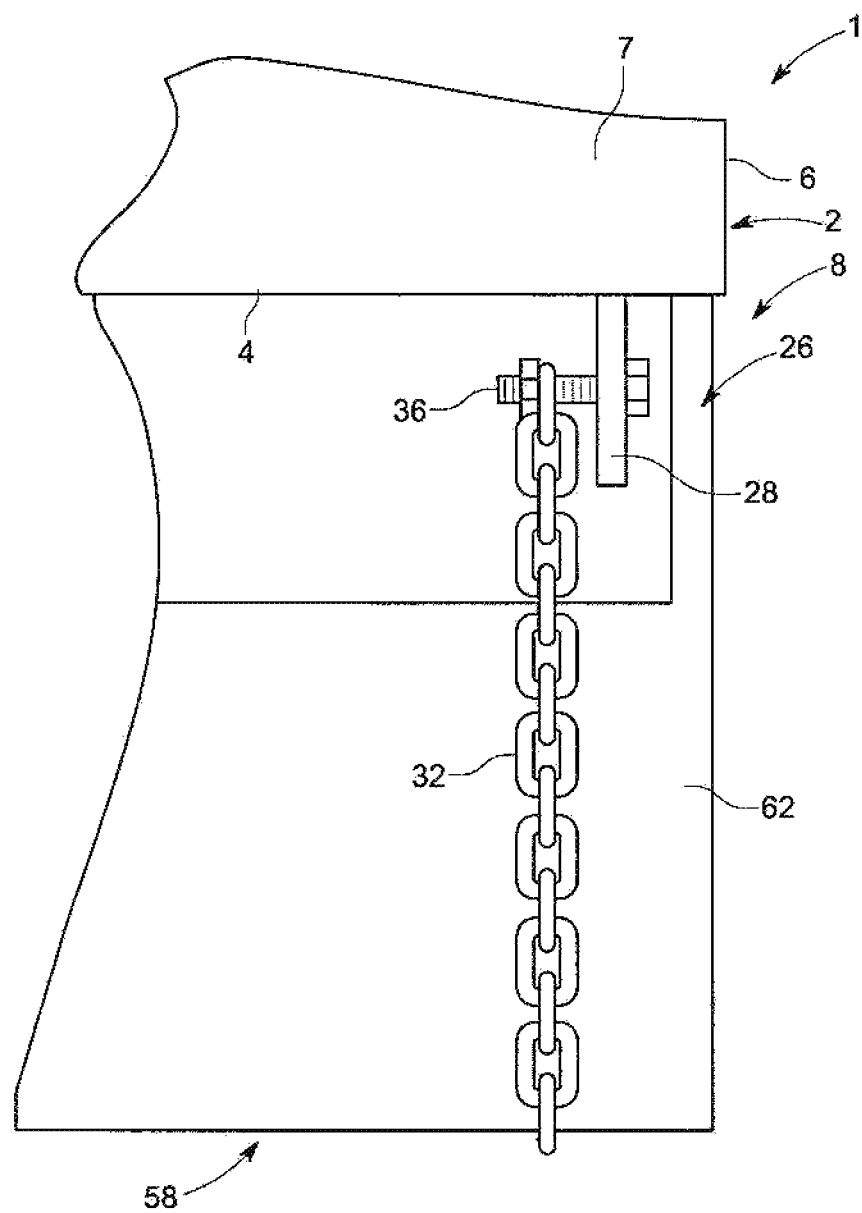
FIG. 18 is a sectional top view of a portion of the enclosure with the bucket of the lifting vehicle attached to the enclosure by way of an upper attachment flange of the bucket attachment system.

As illustrated in FIG. 9, the lifting vehicle 58 may be operated in the forward direction and the bucket 62 raised to register or align with the clearance or spacing between the lower attachment flanges 27 and the upper attachment flanges 28 of the bucket attachment system 26. After the bucket 62 engages the enclosure 2, each bucket fastening member 32 may be extended beneath, around the rear and over the top, respectively, of the bucket 32, and attached to the corresponding upper attachment flange 28, as illustrated in FIGS. 10, 14 and 18. As illustrated in FIG. 11, the lifting vehicle 58 may be operated to raise or lift the loader arms 60 such that the enclosure 2 is lifted by the rising bucket 62. Simultaneously, the enclosure base legs 41 of the enclosure base 40 may begin to pivot with respect to the respective pairs of leg mount members 38 on the enclosure 2, as illustrated in FIGS. 11 and 16. Continued lifting of the enclosure 2 by operation of the loader arms 60 and bucket 62 causes the enclosure base legs 41 to swing downwardly and inwardly by gravity to the vertical or outwardly-angled position illustrated in FIGS. 12, 14 and 17. Accordingly, the vertical or angled enclosure base legs 41 support the enclosure 2 over the ground or supporting surface. The enclosure access platform 52 may be deployed in place between the enclosure base legs 41 at the enclosure rear wall 5 of the enclosure 2. The leg stabilizers 50 may be deployed in place for stabilization purposes.

The bucket 62 of the lifting vehicle 58 may be detached from the enclosure 2 typically by detaching each bucket fastening member 32 from the corresponding upper attachment flange 28 of the bucket attachment system 26 and operating the lifting vehicle 58 in reverse. A user (not illustrated) may ascend the ladder rungs 48 on the ladder 46 and stand on the enclosure access platform 52 to facilitate access to the interior of the enclosure 2 typically through the door opening 11 (FIG. 5) in the enclosure rear wall 5. In some applications, the assembly 1 may be used as a hunting stand in which one or more hunters (not illustrated) observe and shoot game animals from the enclosure 2 through the front observation opening 10, one of the side observation openings 12 and/or the door opening 11.

Prior to use, the bucket 62 may be attached to the enclosure 2 and the assembly 1 lifted in like manner to facilitate transport of the assembly 1 to the desired site or destination for use. After use of the assembly 1, the lifting vehicle 58 may again be attached to the enclosure 2 typically by way of the bucket fastening members 32, typically as was heretofore described. The lifting vehicle 58 may be operated to raise the enclosure 2 and enclosure base 40 above the ground and carry the assembly 1 to a desired destination for storage.

Referring next to FIGS. 19 and 20 of the drawings, in some applications of the assembly 1, the enclosure 2 may be attached to the lifting vehicle 58 via a multi-point hitch bracket 70. The multi-point hitch bracket 70 may be attached to the cylinder or cylinders 61 on the lifting vehicle 58. The multi-point hitch bracket 70 may include a pair of spaced-apart lower bracket hooks 71 and an upper bracket hook 72.

Application of the assembly 1 may be as was heretofore described with respect to FIGS. 8-12. The enclosure 2 may be attached to the multi-point hitch bracket 70 by engagement of the lower bracket hooks 71 with the respective companion lower attachment elements 20 and the upper bracket hook 72 with the companion upper attachment element 15 of the multi-point attachment system 14. The enclosure 2 may be lifted by actuation of the cylinder 61, which lifts the multi-point hitch bracket 70 and the enclosure 2. Simultaneously, the enclosure base 40 may deploy from the collapsed configuration to the extended, enclosure-supporting configuration, as was heretofore described.

While certain illustrative embodiments of the disclosure have been described above, it will be recognized and understood that various modifications can be made to the embodiments and the appended claims are intended to cover all such modifications which may fall within the spirit and scope of the disclosure.

What is claimed is:
1. A vehicle-deployable enclosure assembly for deployment on a supporting surface using a lifting vehicle, comprising:

an enclosure base deployable between a collapsed configuration and an extended, enclosure-supporting configuration;

an enclosure carried by the enclosure base;

at least one attachment system on the enclosure, the at least one attachment system configured to facilitate attachment of the enclosure to the lifting vehicle, the at least one attachment system comprising a bucket attachment system configured to facilitate attachment of the enclosure to a bucket on the lifting vehicle; and the enclosure base configured to deploy from the collapsed configuration to the extended, enclosure-supporting configuration supporting the enclosure over the supporting surface responsive to lifting of the enclosure by operation of the lifting vehicle.

2. The vehicle-deployable enclosure assembly of claim 1 wherein the at least one attachment system comprises a multi-point attachment system configured to facilitate attachment of the enclosure to a multi-point hitch bracket on the lifting vehicle.

3. The vehicle-deployable enclosure assembly of claim 2 wherein the multi-point attachment system comprises a three-point attachment system.

4. The vehicle-deployable enclosure assembly of claim 3 wherein the three-point attachment system comprises an upper attachment element and a pair of spaced-apart lower attachment elements generally beneath the upper attachment element.

5. The vehicle-deployable enclosure assembly of claim 4 wherein the upper attachment element comprises a pair of spaced-apart upper attachment element flanges and an upper attachment element fastener engaging the pair of spaced-apart upper attachment element flanges.

6. The vehicle-deployable enclosure assembly of claim 4 wherein the pair of spaced-apart lower attachment elements comprises a pair of spaced-apart lower attachment element flanges, respectively, and a pair of lower attachment element fasteners engaging the pair of spaced-apart lower attachment element flanges, respectively.

7. The vehicle-deployable enclosure assembly of claim 1 wherein the bucket attachment system comprises a first pair of spaced-apart upper and lower attachment flanges, a second pair of spaced-apart upper and lower attachment flanges, a first bucket fastening member carried by a first one of the first pair of spaced-apart upper and lower attachment flanges and attachable to a second one of the first pair of spaced-apart upper and lower attachment flanges and a second bucket fastening member carried by a first one of the second pair of spaced-apart upper and lower attachment flanges and attachable to a second one of the second pair of spaced-apart upper and lower attachment flanges.

8. A vehicle-deployable enclosure assembly for deployment on a supporting surface using a lifting vehicle, comprising:

an enclosure base deployable between a collapsed configuration and an extended, enclosure-supporting configuration, the enclosure base including a pair of spaced-apart enclosure base legs;

an enclosure carried by the enclosure base, the pair of spaced-apart enclosure base legs pivotally attached to the enclosure;

at least one attachment system on the enclosure, the at least one attachment system configured to facilitate attachment of the enclosure to the lifting vehicle; and the enclosure base configured to deploy from the collapsed configuration to the extended, enclosure-supporting configuration supporting the enclosure over the supporting surface responsive to lifting of the enclosure by operation of the lifting vehicle.

9. The vehicle-deployable enclosure assembly of claim 8 wherein the at least one attachment system comprises a multi-point attachment system configured to facilitate attachment of the enclosure to a multi-point hitch bracket on the lifting vehicle.

10. The vehicle-deployable enclosure assembly of claim 9 wherein the multi-point attachment system comprises a three-point attachment system.

11. The vehicle-deployable enclosure assembly of claim 10 wherein the three-point attachment system comprises an upper attachment element and a pair of spaced-apart lower attachment elements generally beneath the upper attachment element.

12. The vehicle-deployable enclosure assembly of claim 11 wherein the upper attachment element comprises a pair of spaced-apart upper attachment element flanges and an upper attachment element fastener engaging the pair of spaced-apart upper attachment element flanges.

13. The vehicle-deployable enclosure assembly of claim 11 wherein the pair of spaced-apart lower attachment elements comprises a pair of spaced-apart lower attachment element flanges, respectively, and a pair of lower attachment element fasteners engaging the pair of spaced-apart lower attachment element flanges, respectively.

14. The vehicle-deployable enclosure assembly of claim 8 wherein the at least one attachment system comprises a bucket attachment system configured to facilitate attachment of the enclosure to a bucket on the lifting vehicle.

15. The vehicle-deployable enclosure assembly of claim 14 wherein the bucket attachment system comprises a first pair of spaced-apart upper and lower attachment flanges, a second pair of spaced-apart upper and lower attachment flanges, a first bucket fastening member carried by a first one of the first pair of spaced-apart upper and lower attachment flanges and attachable to a second one of the first pair of spaced-apart upper and lower attachment flanges and a second bucket fastening member carried by a first one of the second pair of spaced-apart upper and lower attachment flanges and attachable to a second one of the second pair of spaced-apart upper and lower attachment flanges.

16. A vehicle-deployable enclosure assembly for deployment on a supporting surface using a lifting vehicle, comprising:

an enclosure base deployable between a collapsed configuration and an extended, enclosure-supporting configuration, the enclosure base including:
  a pair of spaced-apart enclosure base legs;
  at least one ladder carried by at least one of the pair of spaced-apart enclosure base legs; and
  an enclosure access platform extending between the pair of spaced-apart enclosure base legs in alignment with the at least one ladder in the extended, enclosure-supporting configuration of the enclosure base;

an enclosure carried by the enclosure base, the pair of spaced-apart enclosure base legs pivotally attached to the enclosure, the enclosure including:
  an enclosure floor;
  an enclosure front wall and an enclosure rear wall extending from the enclosure floor in spaced-apart relationship to each other;
  a pair of spaced-apart enclosure side walls extending from the enclosure floor and between the enclosure front wall and the enclosure rear wall; and an enclosure roof on the enclosure front wall, the enclosure rear wall and the pair of spaced-apart enclosure side walls;

a three-point attachment system configured to facilitate attachment of the enclosure to a three-point hitch bracket on the lifting vehicle, the three-point attachment system including an upper attachment element extending from the enclosure front wall and a pair of spaced-apart lower attachment elements extending from the enclosure front wall generally beneath the upper attachment element;

a bucket attachment system configured to facilitate attachment of the enclosure to a bucket on the lifting vehicle, the bucket attachment system including a first pair of spaced-apart upper and lower attachment flanges extending from the enclosure front wall, a second pair of spaced-apart upper and lower attachment flanges extending from the enclosure front wall, a first bucket fastening member carried by a first one of the first pair of spaced-apart upper and lower attachment flanges and attachable to a second one of the first pair of spaced-apart upper and lower attachment flanges and a second bucket fastening member carried by a first one of the second pair of spaced-apart upper and lower attachment flanges and attachable to a second one of the second pair of spaced-apart upper and lower attachment flanges; and the enclosure base configured to deploy from the collapsed configuration to the extended, enclosure-supporting configuration supporting the enclosure over the supporting surface as the pair of spaced-apart enclosure base legs swing-pivot by gravity on the enclosure responsive to lifting of the enclosure by operation of the lifting vehicle.

17. The vehicle-deployable enclosure assembly of claim 16 further comprising at least one door opening in the enclosure rear wall at the enclosure access platform.

18. The vehicle-deployable enclosure assembly of claim 16 further comprising at least one side observation slot in at least one of the pair of enclosure side walls.

19. The vehicle-deployable enclosure assembly of claim 16 further comprising at least one front observation slot in the enclosure front wall.

\* \* \* \* \*